US012576370B2

(12) United States Patent
Schnur

(10) Patent No.: US 12,576,370 B2
(45) Date of Patent: Mar. 17, 2026

(54) MIXING VALVE

(71) Applicant: Dürr Systems AG,
Bietigheim-Bissingen (DE)

(72) Inventor: Frank Schnur, Bönnigheim (DE)

( * ) Notice: Subject to any disclaimer, the term of this
patent is extended or adjusted under 35
U.S.C. 154(b) by 177 days.

(21) Appl. No.: 18/395,968

(22) Filed: Dec. 26, 2023

(65) Prior Publication Data

US 2024/0173680 A1     May 30, 2024

Related U.S. Application Data

(62) Division of application No. 16/316,467, filed as
application No. PCT/EP2017/066498 on Jul. 3, 2017,
now Pat. No. 11,857,932.

(30) Foreign Application Priority Data

Jul. 15, 2016     (DE) .................... 10 2016 008 644.0

(51) Int. Cl.
B01F 25/00         (2022.01)
B01F 35/83         (2022.01)
(Continued)

(52) U.S. Cl.
CPC ........ B01F 25/1051 (2022.01); B01F 35/833
(2022.01); B05B 1/3026 (2013.01);
(Continued)

(58) Field of Classification Search
CPC .. B01F 25/1051; B01F 35/833; B05B 1/3026;
B05B 1/3405; B05B 12/1418; B05C
5/0233; B05C 11/1036; F16K 3/08
(Continued)

(56) References Cited

U.S. PATENT DOCUMENTS 3,472,423 A     10/1969 Kaplan
4,327,758 A      5/1982 Uhlmann
(Continued)

FOREIGN PATENT DOCUMENTS

CN        101657264 A      2/2010
CN        103221121 A      7/2013
(Continued)

OTHER PUBLICATIONS

International Search Report and Written Opinion for PCT/EP2017/
066498 mailed on Sep. 19, 2017 (13 pages; with English transla-
tion).

(Continued)

*Primary Examiner* — David J Walczak
(74) *Attorney, Agent, or Firm* — Taft Stettinius &
Hollister LLP; Thomas E. Bejin; John W. Carpenter

(57) ABSTRACT

A mixing valve for mixing two coating agent components
(e.g. master batch and hardener) to form a multi-component
mixture, with two coating agent inlets for supplying the two
coating agent components and with two coating agent valves
for controlling the coating agent flow through the two
coating agent inlets, as well as with a coating agent outlet for
discharging the multi-component mixture in a specific out-
flow direction. At least one of the coating agent valves is
formed as a rotary slide valve having two plane-parallel
valve discs which are rotatable relative to each other about
an axis of rotation.

18 Claims, 2 Drawing Sheets

(51) Int. Cl.

| | |
|---|---|
| *B05B 1/30* | (2006.01) |
| *B05B 1/34* | (2006.01) |
| *B05B 12/14* | (2006.01) |
| *B05C 1/10* | (2006.01) |
| *B05C 5/02* | (2006.01) |
| *B05C 11/10* | (2006.01) |
| *F16K 3/08* | (2006.01) |

(52) U.S. Cl.
CPC ........ *B05B 1/3405* (2013.01); *B05B 12/1418* (2013.01); *B05C 5/0233* (2013.01); *B05C 11/1036* (2013.01); *F16K 3/085* (2013.01)

(58) Field of Classification Search
USPC ......... 222/145.1, 145.2, 145.5, 145.7, 145.8; 251/208
See application file for complete search history.

(56) References Cited

U.S. PATENT DOCUMENTS

| | | | | |
|---|---|---|---|---|
| 4,361,282 | A | | 11/1982 | DiVito |
| 4,380,250 | A | | 4/1983 | Stoll |
| 4,440,382 | A | | 4/1984 | Pruvot |
| 4,770,208 | A | | 9/1988 | Stella |
| 4,771,919 | A | | 9/1988 | Ernst |
| 4,962,912 | A | | 10/1990 | Stoll |
| 5,033,650 | A | | 7/1991 | Colin |
| 5,137,178 | A | | 8/1992 | Stokes |
| 5,308,040 | A | * | 5/1994 | Torres ................... F16K 11/074 251/249.5 |
| 5,842,638 | A | | 12/1998 | Reents |
| 7,900,522 | B2 | | 3/2011 | Reeve |
| 8,684,233 | B2 | | 4/2014 | Nishio |
| 8,870,159 | B2 | | 10/2014 | Rowe |
| 9,914,190 | B2 | | 3/2018 | Hartness |
| 10,518,956 | B2 | | 12/2019 | Wolf |
| 2005/0103889 | A1 | | 5/2005 | Langeman |
| 2006/0283889 | A1 | | 12/2006 | Mink |
| 2007/0051749 | A1 | | 3/2007 | Fleet et al. |
| 2011/0198370 | A1 | | 8/2011 | Ho |
| 2011/0253739 | A1 | | 10/2011 | Nishio |
| 2013/0075428 | A1 | | 3/2013 | Brugger et al. |
| 2014/0339320 | A1 | | 11/2014 | Gantenbein |
| 2019/0321790 | A1 | | 10/2019 | Schnur |

FOREIGN PATENT DOCUMENTS

| | | |
|---|---|---|
| DE | 102010046056 B3 | 3/2012 |
| DE | 20 2011 102452 U1 | 6/2012 |
| FR | 2984287 A1 | 6/2013 |
| WO | 2016176090 A1 | 11/2016 |

OTHER PUBLICATIONS

China National Intellectual Property Administration Search Report for Application No. CN201780043836.1 (2 pages; English translation only).
China National Intellectual Property Administration Office Action for Application No. CN201780043836.1 mailed Jul. 16, 2020 (9 pages; no translation available).

* cited by examiner

MIXING VALVE

CROSS-REFERENCE TO RELATED APPLICATIONS

This application is a Divisional Application of, and claims priority to, U.S. patent application Ser. No. 16/316,467, filed on Jan. 9, 2019, which application is a national stage of, and claims priority to, Patent Cooperation Treaty Application No. PCT/EP2017/066498, filed on Jul. 3, 2017, which application claims priority to German Application No. DE 10 2016 008 644.0, filed on Jul. 15, 2016, which applications are hereby incorporated herein by reference in their entireties.

FIELD

The disclosure concerns a mixing valve for mixing two coating components to a multi-component mixture, in particular for mixing adhesive components of a multi-component adhesive or for mixing components of a sealing material.

BACKGROUND

In modern painting systems for painting vehicle body components, coating agents are often used which are mixed together from several components. One example of such multi-component mixtures is adhesives or thickeners, which are used for sound insulation or sealing, for example. Another example is so-called 2-component paints, which consist of master batch and hardener.

In such multi-component systems, the various coating agents are brought together via coating agent valves and then mixed. Various problems occur in the state of the art, which are briefly described below.

One disadvantage of the known valve arrangements for mixing different coating components (e.g. master batch and hardener) is the relatively large dead spaces in the mixing chambers, which leads to considerable flushing losses when the system is at a standstill.

In addition, the known valve arrangements run the risk of drying out, which in the worst case can lead to a complete loss of function in case of curing.

Furthermore, the nozzles and the feed units are difficult to clean.

In addition, the mixing ratio of the various coating components can usually only be changed by replacing the respective mixing head, so that if the mixing ratio is changed, the system must also be modified.

Finally, the known valve arrangements also require additional shut-off valves.

Various aspects of the disclosure are explained using the figures described below.

DETAILED DESCRIPTION

Figure 1A:
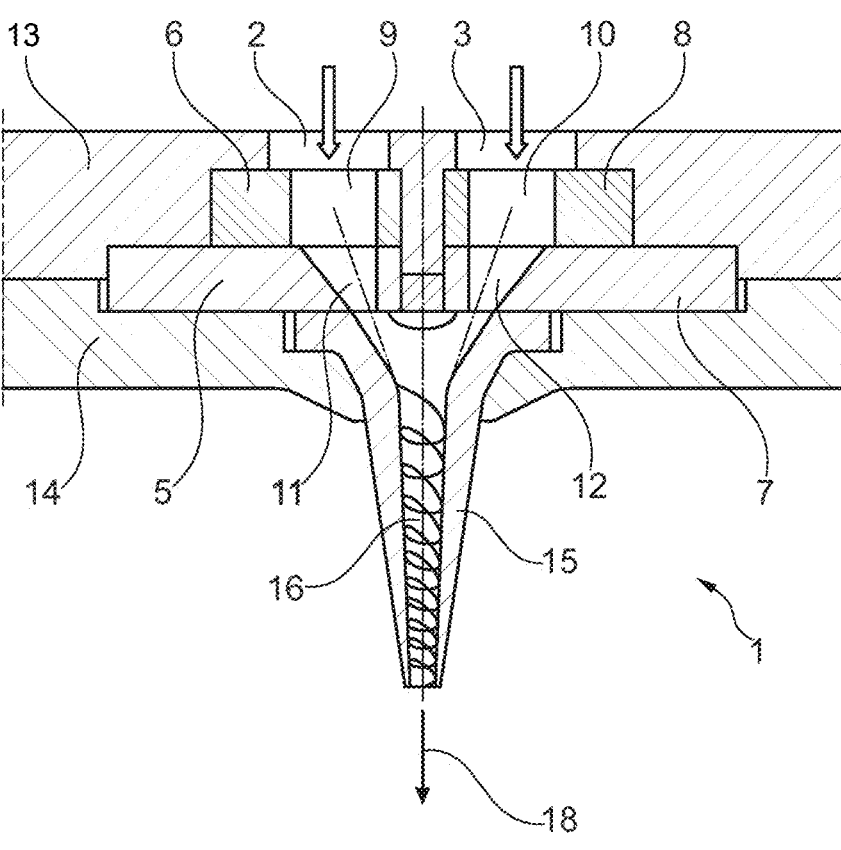
FIG. 1A is a schematic longitudinal view through a mixing valve according to the disclosure.

The disclosure provides an improved valve arrangement.

The mixing valve according to the disclosure is suitable for mixing several coating components to a multi-component mixture. For example, the mixing valve according to the disclosure can be used to mix the masterbatch and hardener of a two-component paint (2-component paint). However, the mixing valve according to the disclosure can also be designed for mixing other coating components, e.g. for mixing components of an adhesive or a thick material.

The mixing valve according to the disclosure has two coating inlets in order to supply the various coating components (e.g. hardener and master batch).

The mixing valve has two coating valves to control the flow of coating agent through the two coating inlets.

Furthermore, the mixing valve also has a coating agent outlet in order to discharge the multi-component mixture in a specific outflow direction.

At least one of the two coating agent valves is designed as a rotary slide valve and has two plane-parallel valve discs which can be rotated relative to each other about an axis of rotation in order to control the respective coating agent flow as a function of the angular position of the valve discs relative to each other.

An advantage of the mixing valve is the so-called zero closure of the respective coating component by a rotary movement (shearing) of the valve discs relative to each other.

A further advantage of the mixing valve according to the disclosure is the very fine adjustment possibility even with very small coating agent flows, as will be explained in detail below.

In general, it should be mentioned that the mixing valve according to the disclosure allows a dynamic, variable adjustment of the mixing ratio of the different coating components.

Another advantage of the mixing valve according to the disclosure is the easy maintenance.

Furthermore, the disclosure also enables simple nozzle replacement, which may even be possible without tools and is described in detail below.

In a variant of the disclosure, the axis of rotation of the valve disks is essentially parallel to the outflow direction at the coating agent outlet. The valve discs are thus arranged with their disc plane transverse to the direction of flow.

In this variant of the disclosure, the two coating components are usually combined downstream behind the downstream valve disc. This is distinguished from a combination of the various coating components within one of the valve disks, as is possible with another disclosure variant, which is described in detail below.

In this first disclosure variant, the two coating agent inlets are preferably arranged next to each other with regard to the outflow direction. The rotatable valve discs are rotatable about two axes of rotation, which are aligned parallel to the direction of outflow and arranged next to each other. The rotatable valve discs can therefore each be rotated about their own axis of rotation, with the axes of rotation of the individual valve discs preferably running parallel to each other and also parallel to the outflow direction.

With this disclosure variant, the coating agent inlets on the one hand and the coating agent outlet on the other hand are preferably located on opposite sides of the valve discs, in each case in relation to the disc plane.

In another variant of the disclosure, on the other hand, the axis of rotation of the valve discs runs transversely, in particular at right angles, to the outflow direction at the coating outlet. The valve discs are thus aligned with their disc plane parallel to the outflow direction.

With this disclosure, the rotary axes of the rotatable valve discs can run coaxially.

In the example of this disclosure, a rotatable valve disc is arranged on both sides of a central, stationary valve disc. Here the coating agent inlets are preferably arranged on opposite sides of the valve disks. This means, for example, that one coating component is fed from the left, while the other coating component is fed from the right.

With this variant of the disclosure, the two coating components can be combined within the stationary valve disc.

The stationary central valve disc is thus a component of the two coating agent valves.

In the preferred example of the disclosure, the downstream valve disc is stationary, while the upstream valve disc is rotatable.

Alternatively, it is also possible for the downstream valve disc to be rotatable while the upstream valve disc is stationary.

In the upstream valve disc and also in the downstream valve disc there is in each case at least one through-hole, wherein the through-holes in the two valve discs can be brought more or less into alignment by a relative rotational movement and then form a free valve cross-section which is dependent on the angle of rotation of the two valve discs relative to one another.

It should be mentioned here that the disclosed mixing valve has a specific valve characteristic curve, whereby the valve characteristic curve reflects the relationship between the angle of rotation on the one hand and the free valve cross-section on the other. By appropriately shaping the through holes in the two valve disks lying on top of each other, a non-linear valve characteristic can be achieved with the disclosure of the mixing valve.

In one example of the design, this valve characteristic curve is progressive. This means that the free valve cross-section changes relatively little at the beginning depending on the angle of rotation, which then allows very fine dosing with small coating agent flows. However, with increasing angle of rotation and thus also increasing coating agent flow, the valve characteristic becomes steeper so that a maximum free valve cross-section can be realized within the available angle of rotation.

The non-linearity of the valve characteristic curve can—as already briefly mentioned—be achieved by a suitable shaping of the through-holes in the valve discs. For example, the through-hole in one of the valve disks can become narrower in the circumferential direction, for example in the form of a drop, in order to achieve the desired non-linear dependence of the free valve cross-section on the angle of rotation.

In addition, the through-hole in the downstream valve disc can also narrow in the direction of flow, especially conically.

It is also possible that the through-hole in the downstream valve disc is angled in the circumferential direction so that the first or second coating agent exits the through-hole with a swirl in the circumferential direction.

The disclosure also allows the mixing valve to have an integrated outlet nozzle which is fed with the multi-component mixture from the coating outlet.

The outlet nozzle may be made of plastic, for example plastic injection moulding, which allows simple and cost-effective production.

The outlet nozzle has a flow channel which can be shaped in such a way that it gives the multicomponent mixture flowing through it a twist. The multicomponent mixture then flows out of the outlet nozzle with a corresponding twist.

It should also be mentioned that the outlet nozzle may be attached to the mixing valve so that it can be replaced. The outlet nozzle can therefore be manufactured as an exchange part.

The mixing valve in accordance with the disclosure enables the outlet nozzle to be changed without tools, for example by means of a bayonet lock or a manually operated cap nut.

It should also be mentioned that the mixing valve can also have a flushing agent inlet to supply flushing agent. In this case, the valve disc can have s a separate through-hole for the flushing agent. Depending on the angle of rotation of the valve disc, either coating agent or flushing agent can then be allowed through.

It should also be mentioned that the coating agent valves are preferably adjusted by an electric motor which rotates the valve discs relative to each other. Two electric motors can also be used here, which make it possible to rotate the valve discs of the coating agent valves independently of each other, which enables the mixing ratio to be adjusted by means of a suitable control of the electric motors.

Finally, it should be mentioned that the disclosure does not only claim protection for the mixing valve described above. Rather, the disclosure also claims protection for a complete coating robot with such a mixing valve or for a complete painting or coating system with at least one such mixing valve.

Figure 1B:
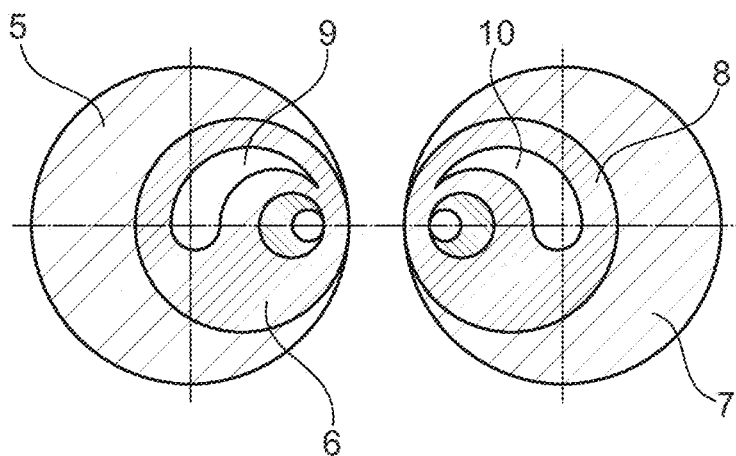
FIG. 1B is a cross-sectional view through the mixing valve according to FIG. 1A in the area of the valve disks.

FIGS. 1A and 1B show different views of an initial example of a mixing valve 1 that can be used, for example, in a paint shop for painting vehicle body components in order to mix different coating components of a thick material.

The mixing valve 1 has two coating agent inlets 2, 3, through which the two coating agent components are fed separately from each other.

In addition, the mixing valve 1 has a coating agent outlet 4, whereby the multi-component mixture consisting of the two coating agents is discharged via the coating agent outlet 4.

Between the two coating agent inlets 2, 3 on the one hand and the coating agent outlet 4 on the other hand there are two coating agent valves which control the coating agent flow through the coating agent inlet 2 or 3.

The coating agent valve between the coating agent inlet 2 and the coating agent outlet 4 has a fixed valve disc 5 and a rotatable valve disc 6.

The other coating fluid valve between the coating fluid inlet 3 and the coating fluid outlet 4 also has a stationary valve disc 7 and a rotatable valve disc 8.

There are through holes 9, 10, 11, 12 in the valve discs 5-8.

The through-holes 9, 11 can be brought more or less into line by a relative rotary movement of the two valve discs 5, 6 relative to each other, so that the freely flowable valve cross-section depends on the angle of rotation of the valve disc 6 relative to the valve disc 5.

The same applies to the through holes 10, 12 in the two valve discs 7, 8, which can also be rotated relative to each other.

It should be noted that the angle of rotation of the valve discs 5, 6 relative to each other can be adjusted independently of the angle of rotation of the valve discs 7, 8 relative to each other. This makes it possible to adjust the mixing ratio of the coating components to be applied very precisely and variably by turning the valve discs 6, 8 appropriately.

In addition, the coating agent flow of the multi-component mixture, which is discharged via the coating agent outlet 4, can also be adjusted.

The mixing valve 1 according to the disclosure thus allows on the one hand an adjustment of the mixing ratio and on the other hand an adjustment of the discharge quantity.

It should also be mentioned that the valve discs 5-8 are accommodated in two housing parts 13, 14, which is only shown schematically here.

In addition, it should be mentioned that the drive of the rotating valve discs 6, 8 is not shown in the drawing.

It should also be mentioned that the mixing valve 1 has an outlet nozzle 15 which is fed with the multi-component mixture from the coating agent outlet 4.

The multi-component mixture flows through a nozzle channel 16 in the outlet nozzle 15. The nozzle channel 16 is shaped in such a way that the multi-component mixture flowing through receives a twist, as indicated in the drawing by the spiral line in the nozzle channel 16.

Figures 2, 3:
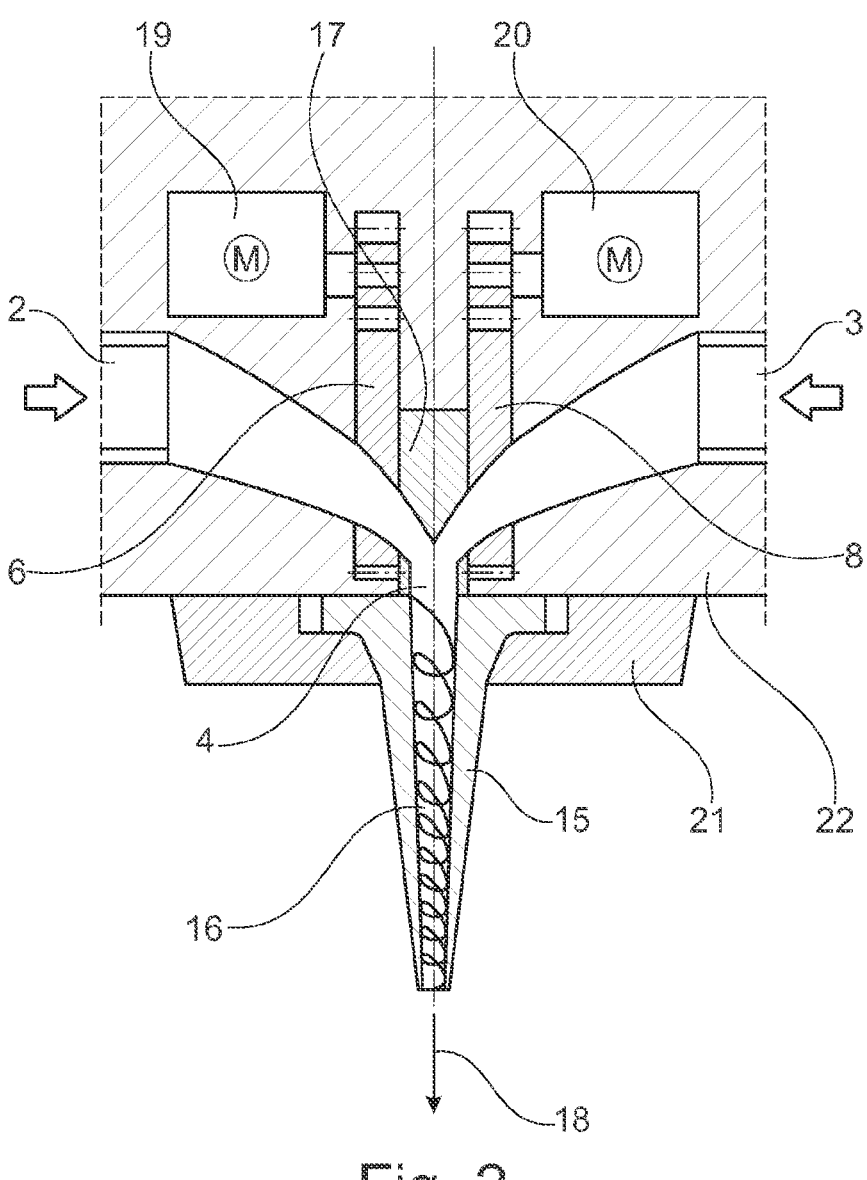
FIG. 2 is a schematic longitudinal view through a mixing valve according to a variation of the mixing valve according to FIGS. 1A and 1B with a different orientation of the valve discs.
FIG. 3 shows an example of a possible valve characteristic curve.

It should also be noted that through holes 9, 10 are drop-shaped in the circumferential direction, as shown in FIG. 1B. This leads advantageously to a non-linear, progressive valve characteristic curve, as shown in FIG. 3. It can be seen from the drawing that the free opening cross-section A of the mixing valve 1 at a small angle of rotation a initially has only a small gradient depending on the angle of rotation a, which enables very fine dosing. As the angle of rotation a increases, the gradient of the valve characteristic curve then becomes steeper so that within the available angle of rotation a maximum free valve cross-section Amax can also be achieved.

FIG. 2 shows a variation of the execution example according to FIGS. 1A and 1B, so that the above description is referred to in order to avoid repetitions, whereby the same reference signs are used for the corresponding details.

A special feature of this design example is that the rotatable valve discs 6, [7] 8 are arranged on both sides of a central, stationary valve disc 17. The stationary valve disc 17 is thus a component of both coating agent valves.

A further feature of this design example is that the two rotatable valve discs 6 and 8 can be rotated about axes of rotation which run coaxially and at right angles to the outflow direction 18.

In addition, two electric motors 19, 20 are shown here, which serve to rotate the two rotatable valve discs 6, 8 relative to the central, stationary valve disc 17.

In this design example, the various coating components are combined within the central, stationary valve disc 17.

It should also be mentioned that the outlet nozzle 15 is attached to a housing 22 of the mixing valve 1 by means of a cap nut 21.

The description of the second example also shows that the valve discs 5-8 do not have to be exactly plate-shaped. Rather, it is sufficient if the valve discs 5-8 run plane-parallel on their side surfaces facing each other in order to enable a rotary movement relative to each other.

The disclosure is not limited to the preferred design examples described above. Rather, a large number of variants and modifications are possible which also make use of the disclosure idea and therefore fall within the scope of protection. In particular, the disclosure also claims protection for the subject-matter and the features of the dependent claims independently of the claims referred to in each case and in particular also without the characteristic feature of the main claim.

The invention claimed is:

1. A mixing valve for mixing a first coating agent component with a second coating agent component of a coating agent to form a multicomponent mixture, having
   a) a first coating agent inlet for supplying the first coating agent component,
   b) a first coating agent valve for controlling a first coating agent flow of said first coating agent component through said first coating agent inlet,
   c) a second coating agent inlet for supplying the second coating agent component,
   d) a second coating agent valve for controlling a second coating agent flow of said second coating agent component through said second coating agent inlet; and
   e) a coating agent outlet for discharging the multicomponent mixture in a specific outflow direction,
   f) wherein the first coating agent valve and the second coating agent valve are each designed as a rotary slide valve with valve discs which are rotatable relative to one another about an axis of rotation,
   g) wherein the axis of rotation of the valve discs is aligned transversely to the outflow direction at the coating agent outlet, and
   h) wherein the first coating agent inlet and the second coating agent inlet are arranged on opposite sides of the valve discs.

2. The mixing valve according to claim 1, wherein the axes of rotation of the rotatable valve discs are coaxial.

3. The mixing valve according to claim 1, wherein a rotatable valve disc is arranged on each side of a central fixed valve disc.

4. The mixing valve according to claim 1, wherein the two coating agent components are brought together within a stationary valve disc.

5. The mixing valve according to claim 1, further comprising an outlet nozzle fed with the multi-component mixture from the coating agent outlet.

6. The mixing valve according to claim 5, wherein the outlet nozzle consists of plastic.

7. The mixing valve according to claim 5, wherein the outlet nozzle has a flow channel which imparts a twist to the multicomponent mixture flowing through.

8. The mixing valve according to claim 5, wherein the outlet nozzle is replaceable without tools.

9. The mixing valve according to claim 5, wherein the outlet nozzle is replaceable by means of a cap nut.

10. The mixing valve according to claim 1, wherein
    a) the mixing valve has a flushing agent inlet for supplying a flushing agent, and
    b) at least one of the valve discs has a further through-hole for the flushing agent in addition to the through-hole for the first or second coating agent.

11. The mixing valve according to claim 1, further comprising an electric motor for rotating the valve discs.

12. The mixing valve according to claim 1, further comprising two electric motors for rotating the rotatable valve disc of the first coating agent valve independently of the rotatable valve disc of the second coating agent valve.

13. The mixing valve according to claim 1, wherein the mixing valve mixes the two coating agent components with a specific mixing ratio, the mixing ratio being adjustable by a corresponding rotation of the valve discs.

14. The mixing valve according to claim 1, wherein the first coating agent valve and the second coating agent valve collectively include a pair of rotatable valve discs disposed on opposite side on a stationary valve disc.

15. The mixing valve according to claim 14, wherein each rotatable valve disc of the pair of rotatable valve discs abuts the stationary valve disc.

16. The mixing valve according to claim 15, wherein the two coating agent components are brought together within the stationary valve disc.

17. A mixing valve for mixing a first coating agent component with a second coating agent component of a coating agent to form a multicomponent mixture, comprising:

a) a first coating agent inlet for supplying the first coating agent component, b) a first coating agent valve for controlling a first coating agent flow of said first coating agent component through said first coating agent inlet, c) a second coating agent inlet for supplying the second coating agent component, d) a second coating agent valve for controlling a second coating agent flow of said second coating agent component through said second coating agent inlet; and e) a coating agent outlet for discharging the multicomponent mixture in a specific outflow direction, f) wherein the first coating agent valve and the second coating agent valve are each designed as a rotary slide valve with valve discs which are rotatable relative to one another about an axis of rotation, g) wherein the axis of rotation of the valve discs is aligned transversely to the outflow direction at the coating agent outlet, and h) wherein the axes of rotation of the rotatable valve discs are coaxial.

18. A mixing valve for mixing a first coating agent component with a second coating agent component of a coating agent to form a multicomponent mixture, comprising:

a) a first coating agent inlet for supplying the first coating agent component, b) a first coating agent valve for controlling a first coating agent flow of said first coating agent component through said first coating agent inlet, c) a second coating agent inlet for supplying the second coating agent component, d) a second coating agent valve for controlling a second coating agent flow of said second coating agent component through said second coating agent inlet; and e) a coating agent outlet for discharging the multicomponent mixture in a specific outflow direction, f) wherein the first coating agent valve and the second coating agent valve are each designed as a rotary slide valve with valve discs which are rotatable relative to one another about an axis of rotation, g) wherein the axis of rotation of the valve discs is aligned transversely to the outflow direction at the coating agent outlet, and h) wherein the two coating agent components are brought together within a stationary valve disc.

* * * * *